United States Patent [19]
Olson et al.

[11] Patent Number: 5,957,997
[45] Date of Patent: Sep. 28, 1999

[54] EFFICIENT FLOATING POINT NORMALIZATION MECHANISM

[75] Inventors: Christopher H. Olson; Martin S. Schmookler, both of Austin, Tex.

[73] Assignee: International Business Machines Corporation, Armonk, N.Y.

[21] Appl. No.: 08/840,926

[22] Filed: Apr. 25, 1997

[51] Int. Cl.[6] ............................................. G06F 5/01
[52] U.S. Cl. ................................................. 708/205
[58] Field of Search ........................ 364/715.04; 708/205

[56] References Cited

U.S. PATENT DOCUMENTS

| | | | |
|---|---|---|---|
| 5,058,048 | 10/1991 | Gupta et al. | 364/748 |
| 5,204,825 | 4/1993 | Ng | 364/715.04 |
| 5,267,186 | 11/1993 | Gupta et al. | 364/748 |
| 5,317,527 | 5/1994 | Britton et al. | 364/715.04 |
| 5,373,461 | 12/1994 | Bearden et al. | 364/748 |
| 5,392,228 | 2/1995 | Burgess et al. | 364/715.04 |
| 5,633,819 | 5/1997 | Brashears et al. | 364/715.04 |
| 5,684,729 | 11/1997 | Yamada et al. | 364/715.04 |
| 5,732,007 | 3/1998 | Grushin et al. | 364/715.04 |
| 5,790,444 | 8/1998 | Olson et al. | 364/715.04 |

Primary Examiner—David H. Malzahn
Attorney, Agent, or Firm—Anthony V.S. England; Daniels E. Venglarik; Andrew J. Dillion

[57] ABSTRACT

A floating point result in a processor is efficiently normalized by predicting the mantissa shift required to normalize the result to an error of one bit position in one direction, resulting in minimum and maximum predicted shifts. Concurrently with an addition of operands to generate a result mantissa, an inversion of the minimum predicted shift is added to the operand exponent to generate an intermediate exponent corresponding to a maximum predicted shift. When the operand addition is complete, the result mantissa is partially shifted in response to the minimum predicted shift. The location of the leading one is then ascertained and compared to the remaining minimum predicted shift. If the minimum predicted shift is the actual shift required to normalize the result, the result mantissa is further shifted by the remaining minimum predicted shift and an exponent carry-in is asserted. On the other hand, if the maximum predicted shift is the actual shift required, the result mantissa is further shifted by the remaining minimum shift and by an additional bit position and the exponent carry-in is not asserted.

20 Claims, 4 Drawing Sheets

EFFICIENT FLOATING POINT NORMALIZATION MECHANISM

BACKGROUND OF THE INVENTION

1. Technical Field

The present invention relates in general to processors in data processing systems and in particular to normalization of floating point numbers for manipulation by such processors. Still more particularly, the present invention relates to improving normalization and associated exponent adjustment to improve overall performance of the processor in the data processing system.

2. Description of the Related Art

Processors in data processing systems are frequently required to manipulate data expressed in scientific notation or "floating point" numbers, which include a mantissa and an exponent. For a variety of reasons, including data precision, implementation considerations, and industry convention, processors frequently require floating point numbers expressed in binary format to include a 1 in its leading digit or most significant bit. Thus, processors typically manipulate floating point numbers expressed in the form $$n = -1^s X 1.f X 2^{exp} \qquad (1)$$

where n is the number, s represents the sign of the number, f is the fractional component of the mantissa, and exp is the exponent of the radix.

Processors which manipulate floating point numbers typically include a normalizer, which receives floating point numbers and adjusts the mantissa and exponent so that the mantissa has a one in its leading digit. The normalization process involves (1) finding the leading one in a floating point number's mantissa, (2) shifting the mantissa until the leading one is in the most significant bit position, and (3) adjusting the exponent to compensate for the shift of the mantissa. Normalization is most commonly performed in the context of adjusting the result of an arithmetic operation involving floating point numbers.

Known normalizers require a high degree of serialized work, degrading processor performance. One known normalizer uses a leading zero anticipator (LZA) capable of predicting the "nibble," or group of four bits, in a result which will contain the leading one. The accuracy of the LZA prediction in this known normalizer is such that the error will only involve one bit position, and always in the direction of the next least significant bit within the mantissa. The LZA generates shift selects for both HEX2 (shift by groups of 16 bits) and HEX1 (shift by groups of 4 bits) shifting multiplexers. Once the HEX1 output data is available, the first four bits of the shifted mantissa may be examined using a leading zero detector (LZD) to determine the exact position of the leading one. The LZD employed by this known normalizer is relatively small in size and may be referred to as a "mini LZD." However, because the resolution of the LZA is only to a nibble, the mini LZD employed by this known normalizer requires four input AND gates to examine the four most significant bits of the HEX1 shifting multiplexer output.

Once the position of the leading one is ascertained, shift selects for a binary (shift by 0, 1, 2, 3, or 4 bits) shifting multiplexer and the exponent adjust may be computed. The ability to shift by 4 bits is required to accommodate the possible one bit position error in the LZA prediction, which will always occur in the same direction.

Examination of this known normalization approach from a timing perspective reveals the serialized nature of normalization. The LZA computation of shift selects may be done in parallel with the main add mechanism. However, normalization cannot be started until after the main add since the output from the main adder forms the input to the HEX2 shifting multiplexer. Once through the HEX2 shifting multiplexer, the data proceeds serially through the HEX1 shifting multiplexer and the LZD. The LZD determines the binary shift and the exponent adjust required. At this point, processing of the mantissa and exponent components diverges into separate paths. The mantissa is forwarded to the binary shifting multiplexer and then to the rounder. The exponent adjust is subtracted from the intermediate exponent to form the adjusted exponent, at which time exponent range checking and final IEEE adjustments may proceed. Thus, the output of the main adder in the known normalizer described follows a long, highly serialized path to the final floating point result.

A second known normalizer, described in U.S. Pat. No. 5,392,228, employs a different LZA/LZD combination to perform normalization. The LZA employed has an accuracy of +/- one bit position, and thus can nearly determine the position of the leading one before the add result is available. Once the main add result is available, a mask is provided from the LZA output which is ANDed with the add result to provide an accurate determination of the leading one position. This result is passed to both the shifting multiplexers and the exponent adjustment logic to compute the final floating point result. The circuits for producing the mask, ANDing the mask with the add result, and computing the leading one position may be referred to as a "big LZD." This arrangement requires significantly more area to implement than the known normalizer previously described.

Once the position of the leading one is accurately determined, processing of the mantissa and exponent components separates. The mantissa passes serially through the HEX2, HEX1, and binary shifting multiplexers. The exponent adjust is subtracted from the exponent, followed by exponent range checking and final IEEE adjustments.

Despite the increased size, the approach followed by the second known normalizer has several beneficial features. Conceptually, the approach is straightforward. The exact position of the leading one is known from the LZA/LZD combination. At this point, the second known normalizer is in a position similar to that of the first normalizer when the output of the mini LZD is available. However, the second normalizer must perform the HEX2 and HEX1 shifts as well the binary shift, while the first normalizer need only perform the binary shift.

An additional benefit of the second normalizer's approach is that computation of the adjusted exponent may be performed in parallel with the multiplexer shifting of the mantissa. This advantage is significant since the delay through an adder is considerably longer than the delay through a multiplexer. Even the small adder required to compute the adjusted exponent may require as long as the multilevel multiplexing required to shift the mantissa. For a timing comparison of the two normalizers described, the following delays are assumed:

shifting multiplexer=1 unit;
mini LZD=1 unit;
big LZD=3 units;
exponent adder=3 units.

From the time the main adder result becomes available until the adjusted exponent is determined, the first normalizer requires processing through the HEX2 shifting multiplexer (1 unit), the HEX1 shifting multiplexer (1 unit), the mini LZD (1 unit) and the exponent adder (3 units) for a total delay of 6 units. During the same period, the second normalizer requires processing through the big LZD (3 units), and then in parallel through both: (a) the HEX2 shifting multiplexer (1 unit), the HEX1 shifting multiplexer (1 unit) and the binary shifting multiplexer (1 unit); and (b) the exponent adder (3 units). Again, the total delay is 6 units. Thus the second normalizer has approximately the same delay as the first normalizer, but requires more overall area to implement.

It would be advantageous to avoid the delay and size of a large LZD. It would also be desirable to avoid waiting until after the HEX2 and HEX1 shifts to begin computing an intermediate exponent, not only due to the long delay of the adder but also because this delays the start of exponent range checking and IEEE adjustments.

SUMMARY OF THE INVENTION

It is therefore one object of the present invention to provide a method and apparatus for improving overall performance of processors in data processing systems.

It is another object of the present invention to provide a method and apparatus to improve normalization of floating point numbers for manipulation by processors in data processing systems.

It is yet another object of the present invention to provide a method and apparatus improving normalization and associated exponent adjustment within a processor in the data processing system.

The foregoing objects are achieved as is now described. A floating point result in a processor is efficiently normalized by predicting the mantissa shift required to normalize the result to an error of one bit position in one direction, resulting in minimum and maximum predicted shifts. Concurrently with an addition of operands to generate a result mantissa, an inversion of the minimum predicted shift is added to the operand exponent to generate an intermediate exponent corresponding to a maximum predicted shift. When the operand addition is complete, the result mantissa is partially shifted in response to the minimum predicted shift. The location of the leading one is then ascertained and compared to the remaining minimum predicted shift. If the minimum predicted shift is the actual shift required to normalize the result, the result mantissa is further shifted by the remaining minimum predicted shift and an exponent carry-in is asserted. On the other hand, if the maximum predicted shift is the actual shift required, the result mantissa is further shifted by the remaining minimum shift and by an additional bit position and the exponent carry-in is not asserted.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
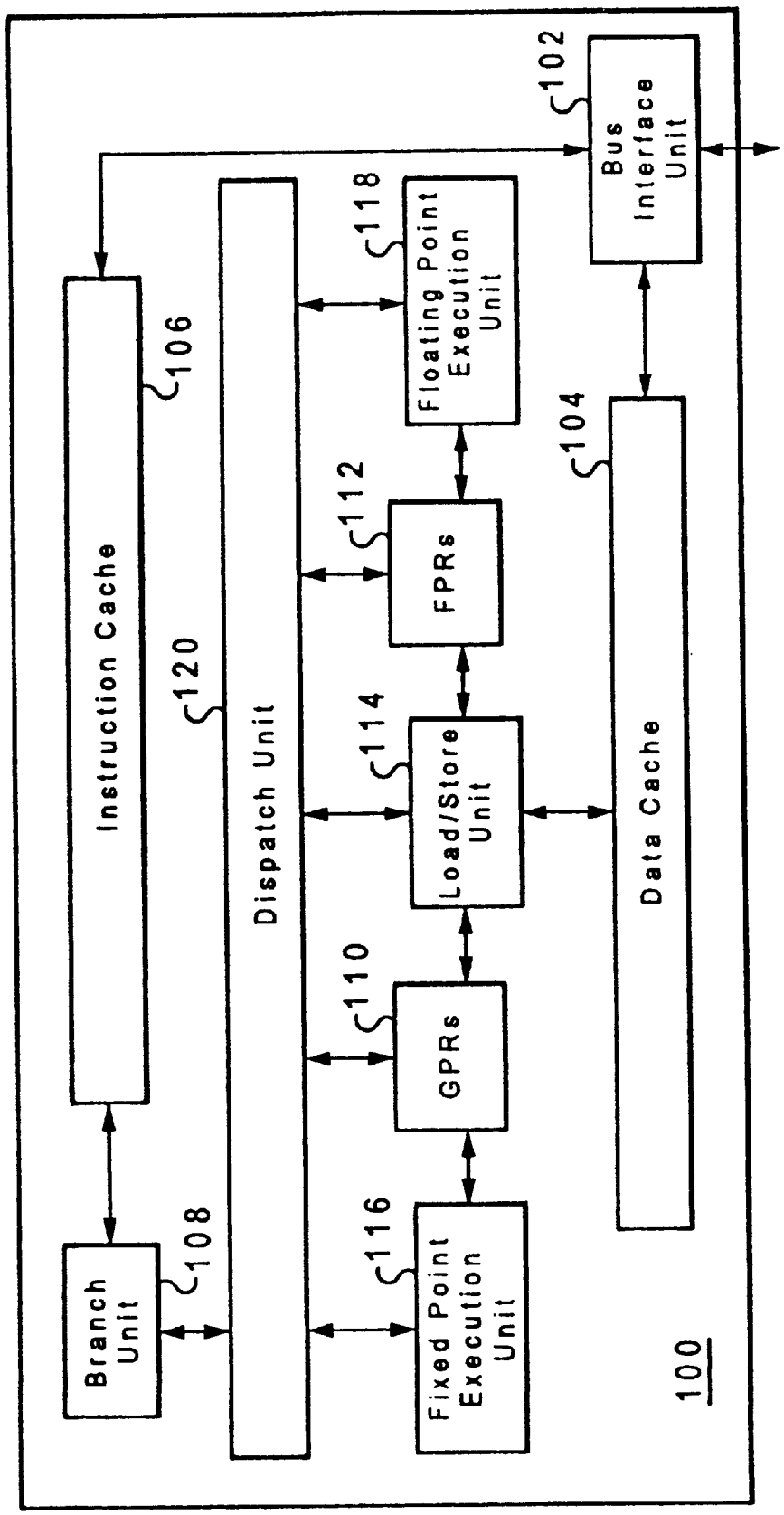
FIG. 1 depicts a processor in which a preferred embodiment of the present invention may be implemented.

With reference now to the figures, and in particular with reference to FIG. 1, a block diagram of a processor in which a preferred embodiment of the present invention may be implemented is depicted. Processor 100 includes a bus interface unit 102 which controls the flow of data between processor 100 and the remainder of the data processing system (not shown). Bus interface unit 102 is connected to both a data cache 104 and an instruction cache 106. Instruction cache 106 supplies instructions to branch unit 108, which determines what sequence of instructions is appropriate given the contents of general purpose registers (GPRs) 110 and floating point registers (FPRs) 112 in processor 100, the availability of load/store unit 114, fixed point execution unit 116, and floating point execution unit 118, and the nature of the instructions themselves. Branch unit 108 forwards the ordered instructions to dispatch unit 120, which issues the individual instructions to the appropriate execution unit (load/store unit 114, fixed point execution unit 116, or floating point execution unit 118).

Fixed point execution unit 116 reads data from general purpose registers 110 and writes the instruction results to designated entries in rename buffer 122. Floating point execution unit 118 reads data from floating point registers 112 and writes the instruction results to designated entries in rename buffer 124. Load/store unit 114 reads data from general purpose registers 110, floating point registers 112, and rename buffers 122 and 124, and writes the data to data cache 104 or to an external memory (not shown) depending on the memory hierarchy and caching protocol employed by the data processing system. Load/store unit 114 also reads data from data cache 104 and writes the data to general purpose registers 110 and floating point registers 112.

Those skilled in the art will appreciate that the details of either the construction of processor 100 or its operation may vary depending on the objectives influencing the design. For example, processor 100 may include multiple fixed point units 116 for executing fixed point instructions without data dependencies in parallel, or a memory management unit regulating the content of data cache 104 and an L2 cache (not shown) outside processor 100.

Figure 2:
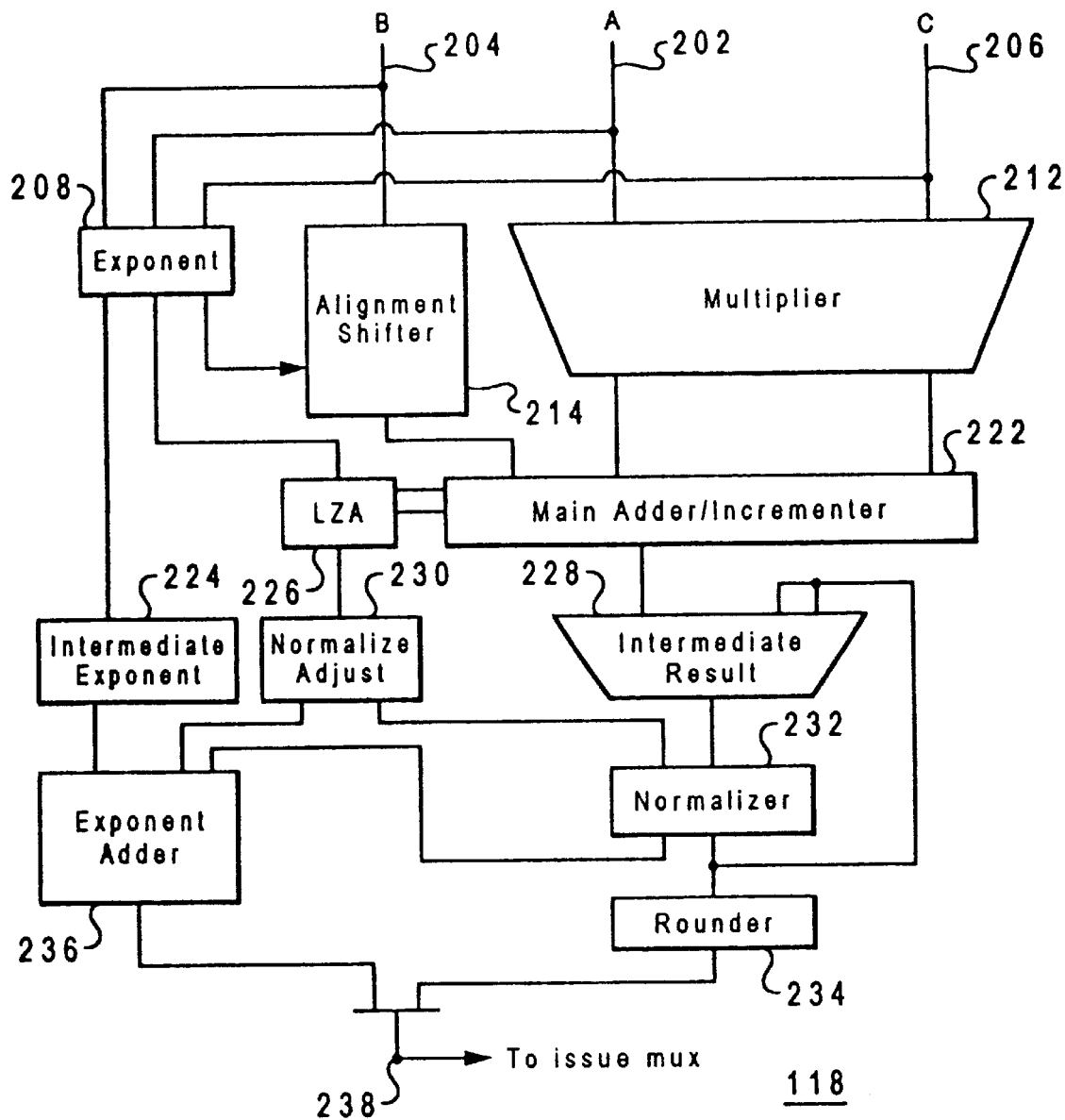
FIG. 2 is a high level block diagram of the floating point execution unit in accordance with a preferred embodiment of the present invention.

Referring to FIG. 2, a high level block diagram of the floating point execution unit in accordance with a preferred embodiment of the present invention is illustrated. Floating point execution unit 118 includes inputs 202, 204, and 206 for receiving operands A, B, and C, respectively, expressed as floating point numbers. Floating point execution unit 118 uses these operands to perform the "fused-multiply-add" and "fused-multiply-subtract" instructions. The fused-multiply-add instruction executes the arithmetic operation (A·C)+B, while the fused-multiply-subtract instruction executes the arithmetic operation (A-C)-B. The exponent portions of operands A, B, and C received at inputs 202, 204, and 206 are provided to exponent calculator 208. The mantissa portions of operands A and C are provided to multiplier 212, while the mantissa portion of operand B is provided to alignment shifter 214.

Multiplier 212 receives the mantissas of operands A and C and reduces the arithmetic function (A·C) to the sum of two intermediate results, known as "sum" and "carry." These intermediate results are provided to main adder/incrementer 222. Exponent calculator 208 calculates an intermediate exponent from the sum of the exponents of operands A and C and stores the intermediate exponent in intermediate exponent register 224. Exponent calculator 208 also calculates the difference between the intermediate exponent and the exponent of operand B, and decodes that value to provide control signals to both leading zero anticipator (LZA) 226 and alignment shifter 214. Alignment shifter 214 shifts the mantissa of operand B so that the exponent of operand B, adjusted to correspond to the shifted mantissa, equals the intermediate exponent. The shifted mantissa of operand B is then provided to main adder/incrementer 222. Main adder/incrementer 222 adds the shifted mantissa of operand B to the sum and carry results of multiplier 212. The output of main adder/incrementer 222 is stored in intermediate result register 228.

Simultaneously with the mantissa addition in main adder/incrementer 222, leading zero anticipator 226 predicts the position of the leading one in the result. A known leading zero anticipator 226, accurate to within +/− one bit position, may be used. Recognizing that the source of error is overflow (carrying in addition operations and borrowing in subtraction operations), the inaccuracy of a prediction by leading zero anticipator 226 is reduced to one direction when logical addition and logical subtraction are taken into account. Since the nature of the arithmetic operation—logical addition or logical subtraction—is known well in advance, leading zero anticipator may predict the location of the leading one in the result mantissa as being in one of two adjacent bit positions. The left bit position, the most significant bit of the pair, will be referred to as the "minimum position" as it represents the minimum shift required for normalization of the result mantissa. Similarly the right bit position, representing the maximum shift required for normalization, will be referred to as the "maximum position." For example, if twelve zeroes were predicted to precede the centerpoint of the minimum/maximum bit position pair, the shift amount pair would be either (11, 12) for logical addition or (12, 13) for logical subtraction. Because the minimum predicted shift amount must always be selected to insure that a leading one is not removed from the result, the shift amount used is always based on an encoding of the minimum position of the predicted bit position pair.

Leading zero anticipator 226 computes a normalize adjust based on the minimum bit position, which is stored in normalize adjust register 230. The normalize adjust from normalize adjust register 230 is provided, together with the intermediate result mantissa from intermediate result register 228, to normalizer 232. Normalizer 232, described in greater detail below in connection with FIG. 4, performs the shifting required to place the leading one in the most significant bit position of the result mantissa. The shifted mantissa is then provided to rounder 234, which rounds-off the result mantissa to the appropriate number of bits.

The normalize adjust from normalize adjust register 230 is also provided to exponent adder 236. To obtain the proper exponent, the exponent is initially adjusted to correct for the maximum shift predicted by leading zero anticipator 226. If the final result of main adder/incrementer 222 requires only the minimum shift, a late "carry-in" to the exponent adder corrects for the minimum shift amount. To adjust the exponent for the maximum shift predicted, the two's complement of the maximum bit position is added to the intermediate exponent. The addition of the exponent adjust to the intermediate exponent may be initiated as soon as the exponent adjust is available from leading zero anticipator 226, which will typically be before the result from main adder/incrementer 222 becomes available.

As shown below, because two's complement notation requires that a one be added to the inverted operand, the two's complement of the maximum shift amount is always equal to the one's complement (inversion) of the minimum shift amount:

| Shift amount | Positive | 1's complement | 2's complement |
|---|---|---|---|
| Minimum (12) | 001100 | 110011 | 110100 |
| Maximum (13) | 001101 | 110010 | 110011 |

Thus, the two's complement of the maximum shift predicted may be obtained by computing the one's complement of the minimum shift, which is available to exponent adder 236 from normalize adjust register 230. The late carry-in to exponent adder 236 is supplied by a leading zero detector in normalizer 232, as described below.

The final result mantissa from rounder 234 is combined with the final exponent from exponent adder 236 and forwarded, at output 238, to the issue multiplexer (not shown) of floating point execution unit 118. From the floating point execution unit's issue multiplexer, the normalized floating point result may be written to a designated entry in a rename buffer or, alternatively, directly to a floating point register.

Figure 3:
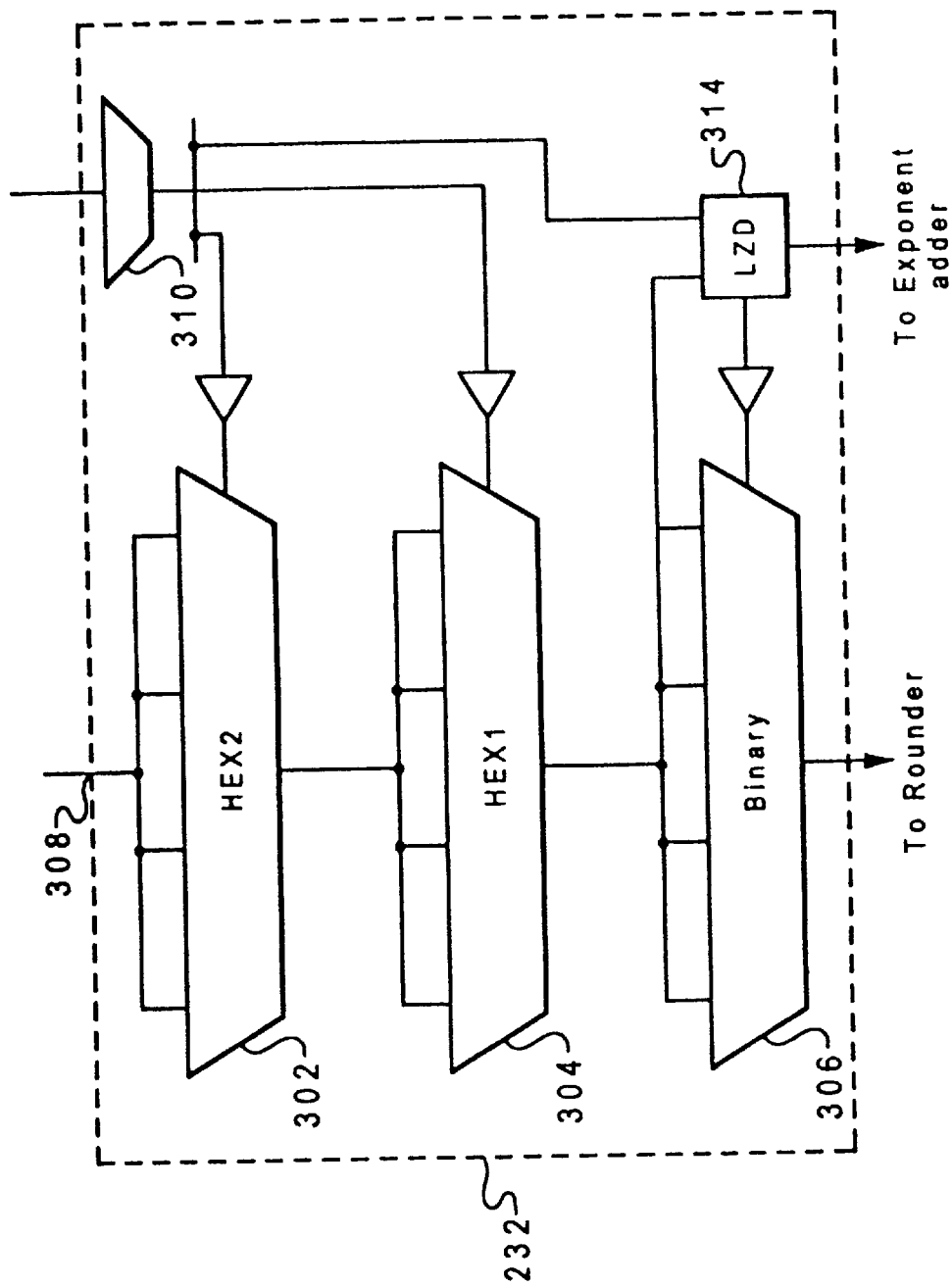
FIG. 3 depicts the normalizer of the floating point execution unit in accordance with a preferred embodiment of the present invention.

Referring to FIG. 3, a diagram of the normalizer of the floating point execution unit in accordance with a preferred embodiment of the present invention is illustrated. Normalizer 232 includes a HEX2 shifting multiplexer 302, a HEX1 shifting multiplexer 304, and a binary shifting multiplexer 306. HEX2 shifting multiplexer 302 receives the intermediate result mantissa from the main adder/incrementer at input 308. HEX2 shifting multiplexer conceptually generates four shifted copies of the intermediate result mantissa, each copy shifted by a different multiple of 16 bits. That is, a first copy is not shifted, a second copy is shifted left by 16 bits, a third copy is shifted left by 32 bits, and a fourth copy is shifted left by 48 bits. A control signal received from multiplexer 310 determines which copy is output to HEX1 shifting multiplexer 304. HEX1 shifting multiplexer 304 operates in a similar fashion, except each of the four copies conceptually generated is shifted left by a different multiple of four bits. A control signal from multiplexer 310 determines which copy is output to binary shifting multiplexer 306.

The floating point execution unit's leading zero anticipator sends an encoded exponent adjust to normalizer 232, which comprises a HEX2 shift amount in the most significant group of bits, a binary shift amount in the least significant group of bits, and a HEX1 shift amount in the intermediate group of bits. The exponent adjust from the leading zero anticipator is received by normalizer 232 at multiplexer 310, which computes the HEX2 and HEX1 shifts from the value received. That is, multiplexer 310 employs the bits of the exponent adjust to generate control signals for HEX2 shifting multiplexer 302 and HEX1 shifting multiplexer 304. The exponent adjust received by normalizer 232 in not encoded in the same manner as the exponent adjust received by exponent adder 236 shown in FIG. 2.

Binary shifting multiplexer 306 generates copies of the shifted mantissa received from HEX1 shifting multiplexer 304 which are shifted to the left by 0, 1, 2, 3, and 4 bits. The copy shifted by four bits is necessary in the event the maximum shift predicted is required. A control signal from leading zero detector 314 determines which copy is forwarded to rounder 234 shown in FIG. 2. Leading zero detector 314 samples the four most significant bits of the output of HEX1 shifting multiplexer 304 and determines if the shifted mantissa will include a leading zero after being shifted by the binary shift amount intrinsic to minimum shift prediction of the leading zero anticipator.

Leading zero detector 314 in the present invention inputs the minimum binary shift predicted by the leading zero anticipator along with the four most significant bits of the output of HEX1 shifting multiplexer 304, generating both the actual binary shift amount and the exponent carry-in. For example, if the leading zero anticipator exponent adjust indicates a binary shift of zero bits (00) and the first four bits of the HEX1 shifting multiplexer 304 output are of the form 1xxx, the actual binary shift required is zero. Furthermore, since the actual binary shift required equals the minimum shift predicted, leading zero detector 314 must assert the exponent carry-in at the exponent adder to correct the exponent adjustment. On the other hand, if the same binary shift were indicated by the leading zero anticipator but the four most significant bits of HEX1 shifting multiplexer 314 were of the form 01 xx, the actual binary shift required would be one. Accordingly, the predicted minimum binary shift amount from the leading zero anticipator would effectively be incremented by not asserting the exponent carry-in at the exponent adder. Although performing seemingly complicated functions, because the accuracy of the leading zero anticipator employed is to an error of only one bit in only one direction, leading zero detector 314 may be implemented using only 2-by-2 AND-OR selection circuits.

Leading zero detector outputs the appropriate exponent carry-in (one or zero) to the floating point execution unit's exponent adder. Leading zero detector 314 also generates a control signal for binary shifting multiplexer 306, selecting the appropriately shifted copy of the result mantissa to forward to rounder 234 shown in FIG. 2.

Figure 4:
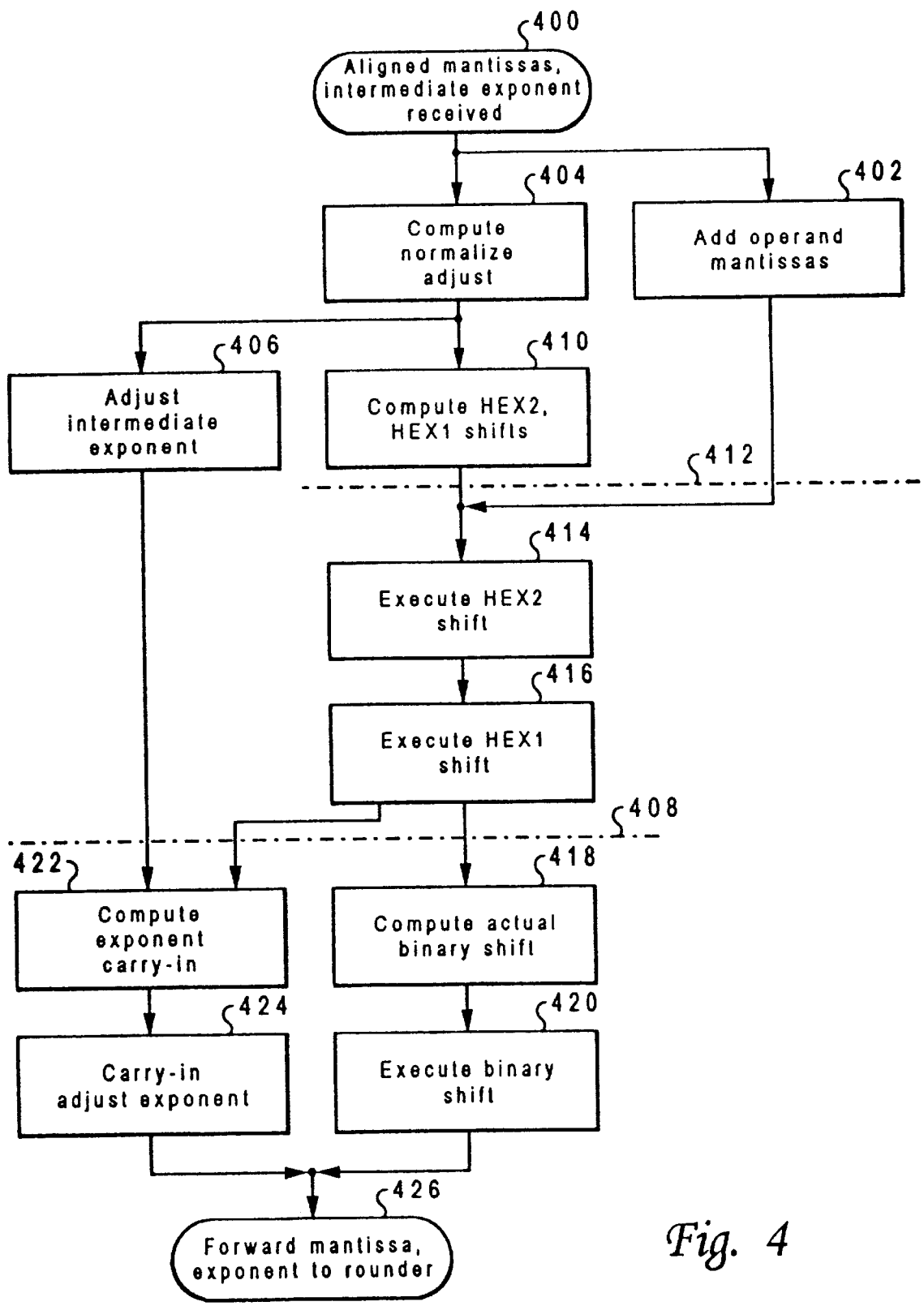
FIG. 4 is a high level flowchart for a method of normalizing a floating point number in accordance with a preferred embodiment of the present invention.

With reference now to FIG. 4, a high level flowchart for a process of normalizing a floating point number in accordance with a preferred embodiment of the present invention is depicted. The process begins at step 400, the point at which the aligned mantissas for the addition/subtraction operands and the intermediate exponent become available. The process then proceeds along divergent paths, in parallel: one path concerning calculation of the result mantissa and the other normalizing the result mantissa to place the leading one in the most significant bit. In the calculation path, the process proceeds to step 402, which illustrates adding or subtracting the operand mantissas. In the normalizing path, the process passes to step 404, which depicts computing a normalize adjust based on a prediction of minimum and maximum shift amounts by a leading zero anticipator.

From step 404 in the normalizing path, the process again diverges along parallel paths, with the normalizing path separating into a mantissa shift path and an exponent adjust path. In the exponent adjust path, the process proceeds to step 406, which illustrates adjustment of the intermediate exponent by addition of the exponent adjust. From step 406, the process in the exponent adjust path is delayed until required results become available in the mantissa shift path, as depicted by dashed line 408. In the mantissa shift path, the process proceeds from step 404 to step 410, which illustrates computing the HEX2 and HEX1 shift amounts. From step 410, the process in the mantissa shift path is delayed while awaiting the results of step 402, the addition of the operand mantissas, as depicted by dashed line 412.

Once the result of the mantissa addition in step 402 are available, the process in the mantissa shift path proceeds next to step 414, which illustrates executing the HEX2 shift, and then to step 416, which depicts execution of the HEX1 shift. Once the result in the HEX1 shift in step 416 becomes available, the process may once again proceed in parallel along both the mantissa shift and exponent adjust paths. In the mantissa shift path, the process passes from step 416 to step 418, which illustrates computing the actual binary shift required to place the leading one in the first bit of the result mantissa, and then to step 420, which depicts executing the binary shift. In the exponent adjust path, the process passes from step 406 to step 422, which illustrates computing the exponent carry-in (one or zero) to be asserted, and then to step 424, which depicts adjusting the exponent by the asserting carry-in. From both step 420 in the mantissa shift path and step 424 in the exponent adjust path, the process proceeds to step 426, which illustrates forwarding the normalized floating point number, comprising the shifted mantissa and the adjusted exponent, to the floating point execution unit's rounder.

As a specific example of the normalization process described, suppose a main adder and a leading zero anticipator in a floating point execution unit receive operand mantissas and an intermediate exponent of decimal 27 (binary 01101). The leading zero anticipator predicts a center point of twelve leading zeros and, recognizing that the operation is a logical subtraction operation, outputs binary 001100 as the normalize adjust. The normalizer computes a HEX2 shift amount of 0 groups (binary 00), a HEX1 shift amount of 3 groups (binary 11), and a binary shift amount of 0 bits. The exponent calculator concurrently computes the one's complement of binary 001100, binary 110011 (which is also the two's complement of binary 001101), as the exponent adjust and adds this to the intermediate exponent:

|   | 011011 | intermediate exponent; |
|---|--------|------------------------|
| + | 110011 | two's complement of maximum shift position 13; |
|   | 001110 | adjust exponent before carry-in. |

The exponent carry-in will be computed after the HEX1 shift.

Once the result from the main adder is available, the mantissa is passed unshifted through the HEX2 shifting multiplexer and shifted 12 bits by the HEX1 shifting multiplexer. At this point the actual binary shift required and the exponent carry-in may be computed. Since the binary shift amount from the leading zero anticipator is zero, the first four bits of the HEX1 output are examined to determine if it is in the form 1xxx or 01xx. If the HEX1 output is 1xxx, the leading zero anticipator binary shift is the actual binary shift. Therefore the mantissa need not be shifted further and a carry-in of 1 must be asserted, producing an exponent of binary 001111. If the HEX1 output is 01 xx, the leading zero anticipator binary shift is not the actual binary shift and the mantissa must be shifted 1 bit. No carry-in need be asserted, producing an exponent of binary 001110.

The normalization process of the present invention provides a substantial increase in execution speed over known prior art normalizers. Because the leading zero anticipator employed operates in parallel with the main add mechanism, no additional timing delays are incurred and both the HEX2 and HEX1 shift selects are completed before the main add result is available. Using the same timing assumptions as above, the processing required from the time the main adder result becomes available until the adjusted exponent is computed includes the HEX2 shifting multiplexer (1 unit), the HEX1 shifting multiplexer (1 unit), and the leading zero detector of the present invention. Although the leading zero detector employed ("fast LZD") is actually faster than the mini LZD employed in a known normalizer as described above, the leading zero detector of the present invention may also be assigned a delay of 1 unit for the purposes of conservative estimation.

From the point at which the output of the leading zero detector becomes available, the processing path diverges. The mantissa requires additional normalization in the binary shifting multiplexer (1 unit). Because the process of adding the exponent adjust predicted by the leading zero anticipator to the intermediate exponent is initiated before the result of the main adder is available, the exponent need only be corrected by the carry-in to complete exponent adjustment. While the delay from data in to data out for a full add in an adder is 3 units, the delay from a carry-in to data out is only one unit. A one unit delay from carry-in to data out may be achieved through a variety of techniques, the simplest of which is to have computed the exponent twice—once assuming carry-in and once without carry-in—and select the appropriate result. Therefore the total delay, along both paths, is 4 units: HEX2 shift, HEX1 shift, fast LZD, and binary shift/exponent carry-in. The normalization mechanism of the present invention is thus substantially faster than known normalizers.

While the invention has been particularly shown and described with reference to a preferred embodiment, it will be understood by those skilled in the art that various changes in form and detail may be made therein without departing from the spirit and scope of the invention.

What is claimed is:

1. A method of normalizing a floating point result in a processor, comprising:

receiving a plurality of operand mantissas in an adder;

generating a result mantissa in said adder equivalent to a sum of said plurality of operand mantissas and a shift control signal in said processor for shifting said result mantissa by an amount corresponding to a minimum position for a leading one in said result mantissa;

adjusting an operand exponent to generate an intermediate result exponent corresponding to shifting said result meantissa by said amount corresponding to said minimum position;

partially shifting said result mantissa in response to said shift control signal;

detecting a position of said leading one in said partially shifted result mantissa; and responsive to said detection of said position of said leading one, shifting said partially shifted result mantissa and generating an exponent carry-in signal to adjust said intermediate exponent, wherein a floating point result is efficiently normalized.

2. The method of claim 1, wherein said step of adjusting an operand exponent to generate an intermediate result exponent corresponding to shifting said result mantissa by said amount corresponding to said minimum position further comprises:

generating an exponent adjust signal in said processor equivalent to an inversion of said shift control signal.

3. The method of claim 2, wherein said step of adjusting said operand exponent further comprises:

receiving said exponent adjust signal and said operand exponent in an exponent calculator; and adding an amount corresponding to said exponent adjust signal and said operand exponent to generate said intermediate result exponent.

4. The method of claim 1, wherein said step of adjusting said operand exponent is performed concurrently with said step of generating a result mantissa and after said shift control signal is generated.

5. The method of claim 1, wherein said step of partially shifting said result mantissa further comprises:

shifting said result mantissa in a first multiplexer a first number of bits in response to a first portion of said shift control signal to generate a first shifted result mantissa; and shifting said first shifted result mantissa in a second multiplexer a second number of bits in response to a second portion of said shift control signal to generate said partially shifted result mantissa.

6. The method of claim 1, wherein said step of shifting said partially shifted result mantissa further comprises:

determining whether shifting said partially shifted mantissa in response to a least significant portion of said shift control signal will shift said leading one into a first bit position of a shifted result mantissa;

responsive to determining that shifting said partially shifted mantissa in response to a least significant portion of said shift control signal will shift said leading one into a first bit position of a shifted result mantissa, shifting said partially shifted mantissa in response to a least significant portion of said shift control signal; and responsive to determining that shifting said partially shifted mantissa in response to a least significant portion of said shift control signal will not shift said leading one into a first bit position of a shifted result mantissa, shifting said partially shifted mantissa in response to a least significant portion of said shift control signal and by an additional bit position.

7. The method of claim 6, wherein said step of generating an exponent carry-in signal to adjust said intermediate exponent further comprises:

responsive to said determining that shifting said partially shifted mantissa in response to a least significant portion of said shift control signal will shift said leading one into a first bit position of a shifted result mantissa, asserting an exponent carry-in in an exponent calculator; and responsive to said determining that shifting said partially shifted mantissa in response to a least significant portion of said shift control signal will not shift said leading one into a first bit position of a shifted result mantissa, asserting no exponent carry-in in an exponent calculator.

8. An apparatus for normalizing a floating point result in a processor, comprising:

receiving means for receiving a plurality of operand mantissas in an adder;

adder means for generating a result mantissa in said adder equivalent to a sum of said plurality of operand mantissas;

first signal means for generating a shift control signal in said processor for shifting said result mantissa by an amount corresponding to a minimum position for a leading one in said result mantissa;

exponent calculator means for adjusting an operand exponent to generate an intermediate result exponent corresponding to shifting said result mantissa by said amount corresponding to said minimum position;

first shifting means for partially shifting said result mantissa in response to said shift control signal;

detector means for detecting a position of said leading one in said partially shifted result mantissa; and second shifting means and second signal means, responsive to said detection of said position of said leading one, for shifting said partially shifted result mantissa and for generating an exponent carry-in signal to adjust said intermediate exponent, wherein a floating point result is efficiently normalized.

9. The apparatus of claim 8, wherein the exponent calculator means further comprises:

third signal means for generating an exponent adjust signal in said processor equivalent to an inversion of said shift control signal.

10. The apparatus of claim 9, wherein said exponent calculator means further comprises:

second receiving means for receiving said exponent adjust signal and said operand exponent in said exponent calculator means; and second adder means for adding an amount corresponding to said exponent adjust signal and said operand exponent to generate said intermediate result exponent.

11. The apparatus of claim 2, wherein said exponent calculator means operates in parallel with said adder means after said shift control signal is generated.

12. The apparatus of claim 8, wherein said first shifting means further comprises:

means for shifting said result mantissa in a first multiplexer a first number of bits in response to a first portion of said shift control signal to generate a first shifted result mantissa; and means for shiftig said first shifted result mantissa in a second multiplexer a second number of bits in response to a second portion of said shift control signal to generate said partially shifted result mantissa.

13. The apparatus of claim 8, wherein said second shifting means and said second signal means further comprise:

comparison means for determining whether shifting said partially shifted mantissa in response to a least significant portion of said shift control signal will shift said leading one into a first bit position of a shifted result mantissa;

third shifting means, responsive to determining that shifting said partially shifted mantissa in response to a least significant portion of said shift control signal will shift said leading one into a first bit position of a shifted result mantissa, for shifting said partially shifted mantissa in response to a least significant portion of said shift control signal; and fourth shifting means, responsive to determining that shifting said partially shifted mantissa in response to a least significant portion of said shift control signal will not shift said leading one into a first bit position of a shifted result mantissa, for shifting said partially shifted mantissa in response to a least significant portion of said shift control signal and by an additional bit position.

means for shifting said result mantissa in a first multiplexer a first number of bits in response to a first portion of said shift control signal to generate a first shifted result mantissa; and means for shifting said first shifted result mantissa in a second multiplexer a second number of bits in response to a second portion of said shift control signal to generate said partially shifted result mantissa.

14. The apparatus of claim 13, wherein said second signal means further comprises:

signal means, responsive to said determining that shifting said partially shifted mantissa in response to a least significant portion of said shift control signal will shift said leading one into a first bit position of a shifted result mantissa, for asserting an exponent carry-in in an exponent calculator.

15. A normalizing mechanism in a processor, comprising:

a main adder receiving a plurality of operand mantissas and generating a result mantissa equivalent to a sum of said plurality of operand mantissas;

a leading zero anticipator generating a shift control signal corresponding to a predicted minimum position for a leading one in said result mantissa;

an exponent calculator generating, from an operand exponent, an intermediate result exponent corresponding to shifting said result mantissa to said predicted minimum position;

first and second shifting multiplexers partially shifting said result mantissa in response to said shift control signal to generate a partially shifted result mantissa;

a leading zero detector detecting a position of said leading one in said partially shifted result mantissa and generating an exponent carry-in signal to adjust said intermediate exponent; and a third shifting multiplexer, responsive to said detection of said position of said leading one, shifting said partially shifted result mantissa, wherein said normalizing mechanism efficiently normalizes a floating point result.

16. The normalizing mechanism of claim 15, wherein said exponent calculator further comprises:

an inverter inverting said shift control signal; and an adder generating an intermediate result exponent equivalent to the sum of said operand exponent and an amount corresponding to an inversion of said shift control signal.

17. A processor having an efficient normalization mechanism, comprising:

a multiplier receiving a plurality of operand mantissas and reducing a multiplication operation between said plurality of operand mantissas to a sum of two intermediate operands;

an exponent calculator receiving a plurality of operand exponents and calculating an intermediate exponent, said exponent calculator operating in parallel with said multiplier;

a main adder receiving said two intermediate operands and calculating an intermediate mantissa equalling a sum of said two intermediate operands;

a leading zero anticipator receiving said intermediate exponent and predicting a position of a leading one in a result to an error of one bit position in one direction and computing a normalize adjust equalling a minimum predicted shift, said leading zero anticipator operating in parallel with said main adder;

a normalizer receiving said intermediate mantissa and said normalize adjust and shifting said intermediate mantissa by an amount equalling said minimum predicted shift to generate a shifted mantissa;

an exponent adder receiving said normalize adjust and computing an adjusted exponent corresponding to said minimum predicted shift; and a leading zero detector receiving said shifted mantissa and determining a position of a leading one in said shifted mantissa, said leading zero detector asserting a carry-in to said exponent adder to generate a result exponent and signaling said normalizer to forward said shifted mantissa as a result mantissa if said minimum predicted shift equals a required shift, wherein a normalized floating point result is efficiently calculated.

18. The processor of claim 17, wherein said leading zero detector signals said normalizer to shift said shifted mantissa by an additional bit position to generate said result mantissa and signaling said exponent adder to forward said adjusted exponent as said result exponent if said minimum predicted shift does not equal said required shift.

19. The processor of claim 17, further comprising:
a rounder receiving said result mantissa and rounding said result mantissa to a predetermined number of bits.

20. The processor of claim 19, further comprising:
an issue multiplexer combining said result mantissa and said result exponent.

* * * * *

UNITED STATES PATENT AND TRADEMARK OFFICE
CERTIFICATE OF CORRECTION

PATENT NO. : 5,957,997
DATED : September 28, 1999
INVENTOR(S) : Olson et al.

It is certified that error appears in the above-indentified patent and that said Letters Patent is hereby corrected as shown below:

Col. 11, Lines 57 - 64 should be deleted.

Signed and Sealed this

Twenty-sixth Day of September, 2000

Attest:

Q. TODD DICKINSON

Attesting Officer

Director of Patents and Trademarks